Aug. 5, 1958

W. A. THOMAS 2,846,075

FILTERS

Filed Aug. 27, 1956

INVENTOR.
William A. Thomas.
BY
Robert H. Wendt,
Attorney.

United States Patent Office 2,846,075
Patented Aug. 5, 1958

2,846,075

FILTERS

William A. Thomas, Chicago, Ill., assignor to Marvel Engineering Company, Chicago, Ill., a corporation of Illinois Application August 27, 1956, Serial No. 606,267

1 Claim. (Cl. 210—457)

The present invention relates to filters and is particularly concerned with the provision of an improved filter which is adapted to be easily taken apart for cleaning or replacement of the filter element, but which is also locked against coming apart due to vibration which is caused by the machinery to which the filter is attached.

Filters of the present type are located in tanks or other containers and since they are assembled by means of threaded connections, the vibration may sometimes cause the filter to come apart in the tank where it would not be visible but, of course, the filtering action would cease.

One of the objects of the invention is the provision of an improved filter structure in which the parts are held together by threaded members and in which they are prevented from coming apart due to vibration by an improved locking construction.

Another object of the invention is the provision of an improved filter which is simple, efficient, durable, adapted to be cleaned easily, and adapted to be used at high rates of flow and high or low pressures for long periods of time without necessity for repair or replacement of any of its parts.

Another object of the invention is the provision of an improved filter of the class described which is adapted to be manufactured at a very low cost and thus placed within the range of a vast number of users, and in which the filtering unit is adapted to be recleaned and reused many times so that there is no necessity for replacement of any of the parts of the filter under ordinary conditions of use.

Other objects and advantages of the invention will be apparent from the following description and the accompanying drawings, in which similar characters of reference indicate similar parts throughout the several views.

Referring to the drawings, of which there is one sheet,

Figure 1:
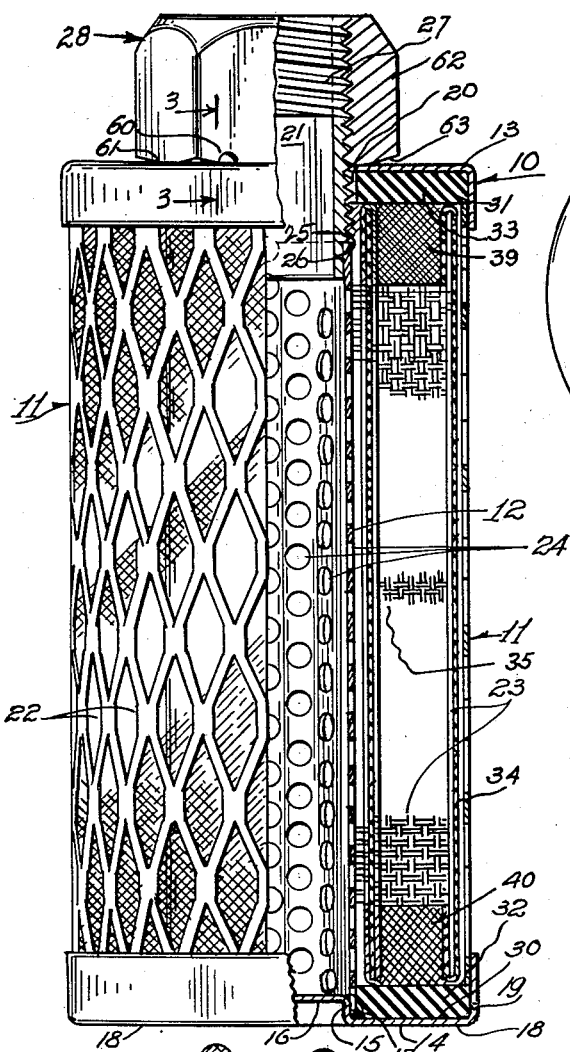
Fig. 1 is an elevational view in partial section taken on a plane passing through the axis of the filter embodying my invention.
Figure 2:
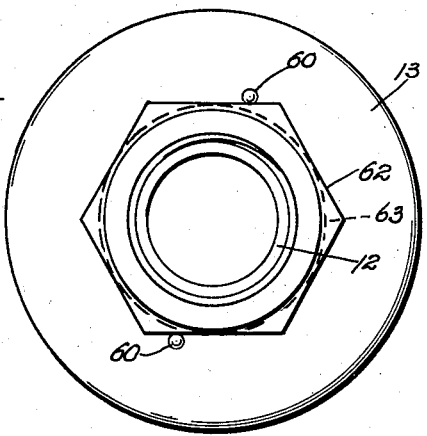
Fig. 2 is a top plan view.
Figure 3:
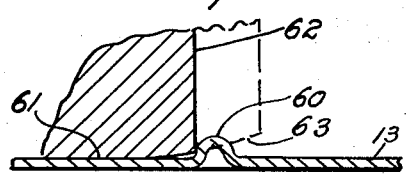
Fig. 3 is a fragmentary sectional view taken on the plane of the line 3—3 of Fig. 1, looking in the direction of the arrows.
Figure 4:
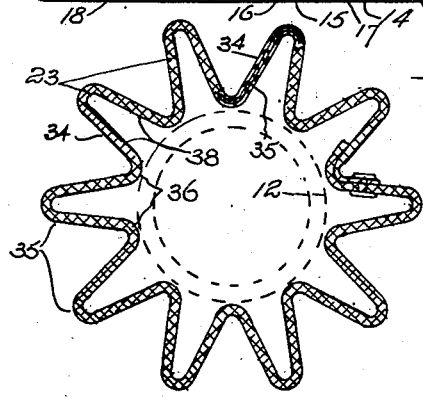
Fig. 4 is a top plan view of the filter element.

Referring to Fig. 1, the filter 10 embodying my invention is preferably provided with reinforcing and supporting inner and outer housings, the outer housing being indicated in its entirety by the numeral 11, and the inner housing by the numeral 12.

The housing includes a top plate 13 and a bottom plate 14, these plates serving to close the ends of both of these housings so far as they are intended to be closed.

The bottom plate 14, for example, may consist of a stamped sheet metal member, which is formed with a centrally located cylindrical flange 15 integrally joined to a circular portion 16, which closes the lower end of the inner housing 12. The diameter of the cylindrical portion 15 is preferably such that the inner housing 12 fits about the cylindrical portion 15, to which it is soldered at 17.

Integrally joined to the lower end of the cylindrical portion 15 is a radially and outwardly extending bottom flange 18, which carries an upwardly extending outer cylindrical flange 19. The outer cylindrical flange 19 is at such a diameter that it is adapted to receive the outer housing member 11. The top plate 13 is similar in construction to the bottom plate 14, except that its circular plate 16 is provided with a centrally located aperture 20 for passing a tubular conduit member 21, which is carried by the inner housing 12.

The outer housing member 11 is preferably formed of expanded metal, which has been so pressed that all of its parts are in substantially the same plane; and this housing member may be formed out of a rectangular sheet of such expanded metal, which has been formed into a cylinder and its adjacent edges soldered, brazed, welded, or otherwise secured together.

The outer housing member 11 as well as the inner housing and all other metallic parts of the filter, are preferably galvanized so as to protect them from corrosion, which might be induced by exposure to the elements or use in corrosive liquids.

The diamond shaped apertures 22 in the expanded metal of the outer housing 11 are of sufficient size to pass relatively thick liquids without restraint, but the expanded metal excludes all large particles of foreign matter from contact with the filtering unit 23, which is located between the housings.

The expanded metal is of sufficient strength, being preferably made of steel, so that it protects the filtering unit 23 against damage, whether it be by compression exerted against the strainer or by the filter being knocked about when it is connected to a hose and thrown into a receptacle or into engagement with some other hard object.

The inner housing member 12 is also preferably made of steel, being formed out of a rectangular sheet, which has punched in it a multiplicity of relatively small holes 24, the holes being staggered vertically and arranged in regularly spaced relation to each other circumferentially of the cylindrical member 12.

The ends of this rectangular sheet of metal are also soldered, brazed, or welded together to form a cylinder of sufficient size to fit on the cylindrical portion 15 of the bottom plate 14 and on the cylindrical surface 25 of the tubular member 21.

The inner housing 12 is also soldered, welded, or brazed to the flange 26, and this inner housing is adapted to serve as a tension member as well as a conduit. Its tubular portion 21 is provided with external threads 27 adapted to engage with the inner threads of the standard nut 28, which serves as a combined nut and as an extension of the conduit 29 inside the filter.

The upper cap or top plate 13 is formed with a camming protuberance 60 which may comprise a relatively sharply pressed spherical tip pressed out of the body of the metal and projecting outwardly.

The nut 28 is preferably polygonal in shape, such as hexagonal. The camming tip 60 is located at a radius from the axis which is inside the corners 61 of the nut but outside the flats 62 of the nut.

The corners may have a slight chamfer 63 and the action of these parts is as follows.

The nut is tightened on the central tube 21 until it drives the two end plates with their rubber washers 31 and 33 tightly against the ends of the filter unit 12. This prevents leakage around the ends.

After nut 62 approaches the end plate 13, its lower surface will encounter the locking tip 60, but the rubber washers permit the two end plates to be forced toward each other compressing the washers against the filter unit.

The sloping sides of the tip 60 tend to cam the end plate 13 downward until each corner 61 is passed at tip 60. The chamfer 63 aids in this camming action, but is relatively shallow so that the tip 60 sticks up in the way of the corners 61, thus the pressed metal tip 60 is urged into this locking condition in the way of the corners 61 by the rubber washers which are located in the end gaps, a certain amount of which is required to turn the nut over the locking tip 60 to disassemble the filter.

The filter can never be shaken apart by vibration. Any number of the tips 60 may be employed but only one is required. This gives six flat positions in which the nuts may be locked.

The tip 60 being sharp may form a locking depression in the bottom of the nut by tapping the nut with a hammer, thus the nut may be locked in practically any position.

Annular spaces 30, 31, in the lower plate 14 and upper plate 13 are preferably provided with one or more soft rubber washers 31, 32, and 33. These washers are adapted to engage the ends of the filter unit 23 and the ends of the outer housing 11 to provide the end plates with a resilient clamping action and to seal the ends of the filtering unit 23 against the passage of unfiltered liquid.

The washers 31—33 have a frictional fit in the annular chambers 30, 31 so that they are adapted to remain in place until removed by means of a tool.

The filtering unit 23 preferably consists of a layer or frame of galvanized wire cloth 34 located inside a second layer 35 of filtering material, such as bronze wire gauze of very fine mesh, such as, for example, 100 meshes to the square inch.

The galvanized wire cloth may be relatively coarse, such as, for example, eight meshes to the inch more or less, and the gauze is supported and reinforced by the wire cloth, which provides a stiff form for the gauze.

The filtering unit is preferably substantially of the same length as the outer housing 11, so that both the filtering unit and the outer housing may be clamped simultaneously between the upper soft washer 33 and the lower soft washers 31', 43' by the end plates 13, 14.

The shape of the filtering unit in plan is that it is generally cylindrical, but the outline of the gauze and wire cloth in plan is that it is radially synclinal or sinuous, being formed with a plurality of easy bends 36 on the inside and all at the same radius, and a plurality of easy bends 37 on the outside, all located at substantially the same radius, and these bends are connected by the radially extending portions 38.

The filtering unit may be made out of a long rectangular sheet of galvanized wire cloth, to which there is applied a sheet of practically similar length of bronze gauze, which is wider, so that the upper and lower edges of the gauze may be folded over at 39 and 40 and soldered to the wire cloth, if desired. As a matter of fact, after the wire gauze and its galvanized wire cloth frame have been bent to the sinuous and generally cylindrical form, the gauze is permanently anchored on the galvanized wire frame, and it is only necessary to solder together the abutting or overlapping ends of the gauze and wire mesh, where they join, to form the generally cylindrical form, as for example, at one point in the circumference of the filtering unit.

Although the ends of the filtering unit are sinuous and irregular, the free edge surface of the filtering unit is adapted to be engaged by the soft washers 31'—33 so as to prevent the passage around the ends of any unfiltered liquid.

The galvanized wire cloth is adapted to maintain the gauze in the desired shape and to prevent its local collapse, while the inner housing 12 is adapted to be engaged by the inner easy bends 36 when the filtering unit is under pressure, to prevent the collapse of the unit from its generally cylindrical form.

While the easy bends 36 as shown out of contact with the inner housing 12, they may be forced into contact with the inner housing when the gauze becomes partially filled and it is subjected to a predetermined amount of pressure. This pressure acts radially and tends to cause the resilient sinuous filtering unit to contract with its folds closer together so that it has a smaller inner diameter engaging the inner housing 12.

Due to the use of a metallic gauze as the filtering unit, the present filter may be cleaned and used over again practically an unlimited number of times by merely reversing the flow temporarily during a cleaning operation; and due to its shape and structure the present filter has a greatly increased effective filtering area over the devices of the prior art. This gives it a much greater efficiency for the same size filter unit than is evidenced by the prior art devices.

The present filter is simple in structure and easy to assemble so that it may be manufactured at a low cost, and it thus provides a better filter at a lower cost than any of the devices of the prior art.

The assembly of the device will be apparent from the foregoing drawings. The inner housing 12 is permanently attached to the bottom plate 14, as described, and to the upper tubular member 21. The washers 31', 32' may be placed in the bottom plate 14, and the filtering unit 23 may be slid over the inner housing 12. The outer housing may then be slid over the filtering unit into the recess 30 of the bottom plate 14, and then the top plate may be placed over the tubular member 21, the top plate having been previously provided with its rubber washer 33.

The length of the tubular member 21 is such that there is a threaded portion projecting for engagement with the nipple 28, which serves both as a nut and a conduit. When the nipple 28 is threaded home, it places the inner housing 12 under tension and drives the upper plate 13 against the filtering unit 23 and the outer housing 11 to clamp them between the rubber washers of the upper and lower end plates.

It will thus be observed that I have invented an improved filter which is locked against being shaken apart by vibration. The present locking means is positive, capable of economic manufacture, and adapted to be used for a longer period of time.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

A housing unit for filters or the like, comprising an inner apertured cylindrical housing, an outer apertured cylindrical housing, a top plate on the top of said housings, a bottom plate on the bottom of said housings, said bottom plate comprising a stamped sheet metal member having a cylindrical portion fitting the end of the inner housing, to which it is secured, and having an upwardly extending, outer cylindrical flange, forming an annular space, a soft resilient rubber washer in said annular space, a threaded tubular extension on said inner housing and passing through a central aperture in said top plate, said top plate having a downwardly extending cylindrical flange forming an annular space about said inner housing, a soft resilient rubber washer in said latter annular space, a filter unit comprising an elongated metal member which is generally cylindrical, but having radially extending, sinuous portions of stiff wire cloth supporting a layer of fine wire gauze thereon, said outer housing and said filter unit engaging in said soft rubber washers at each end of the filter unit, an internally threaded nut having flat sides and a chamfer on its lower face at the corners, said nut being threaded on said tubular extension of said inner housing and urging said top plate and bottom plate toward each other, pressing the ends of said filter unit into said rubber washers, said top plate having a camming projection located outwardly on the top plate, comprising a sharply spherical pressed tip, said tip being located outwardly of the flat sides of the nut, but inwardly of the chamfered corners of the nut, the nut riding up over the tip at each corner of the nut, when rotated, and compressing the rubber washers, and the nut moving inwardly of the tip at each flat side of the nut, the rubber washers again expanding to hold the tip in position to prevent the loosening of the nut under vibration on engagement of the tip with a corner of the nut.

References Cited in the file of this patent

UNITED STATES PATENTS

| | | |
|---|---|---|
| 185,084 | Dooly | Dec. 5, 1876 |
| 2,394,666 | Cloedy et al. | Feb. 12, 1946 |
| 2,730,241 | Thomas | Jan. 10, 1956 |

FOREIGN PATENTS

| | | |
|---|---|---|
| 62,828 | Denmark | Oct. 23, 1944 |